United States Patent
Ales et al.

(10) Patent No.: US 6,662,247 B1
(45) Date of Patent: Dec. 9, 2003

(54) PROTOCOL FOR EXTENDED DATA TRANSFER IN SCAN-BASED INDUSTRIAL CONTROLLER I/O SYSTEM

(75) Inventors: Rick Ales, Mayfield Heights, OH (US); Robert J. Kretschmann, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 426 days.

(21) Appl. No.: 09/671,381

(22) Filed: Sep. 27, 2000

Related U.S. Application Data
(60) Provisional application No. 60/168,001, filed on Nov. 30, 1999.

(51) Int. Cl.[7] ................................................. G06F 3/00
(52) U.S. Cl. ............................ 710/52; 710/21; 710/7
(58) Field of Search ............................. 710/52, 57, 2, 710/5–7, 21; 700/2, 5, 80–82, 105, 107; 370/452, 449; 340/3.62, 825.5, 825.51, 825.52

(56) References Cited

U.S. PATENT DOCUMENTS

| | | | | |
|---|---|---|---|---|
| 4,667,323 A | * | 5/1987 | Engdahl et al. | 340/825.52 |
| 4,829,297 A | * | 5/1989 | Ilg et al. | 370/468 |
| 4,876,664 A | * | 10/1989 | Bittorf et al. | 700/2 |
| 5,764,927 A | * | 6/1998 | Murphy et al. | 710/125 |
| 5,933,347 A | * | 8/1999 | Cook et al. | 700/82 |

* cited by examiner

*Primary Examiner*—Khanh Dang
(74) *Attorney, Agent, or Firm*—Quarles & Brady LLP; Alexander M. Gerasimow; William R. Walbrun

(57) ABSTRACT

Extended low priority data is integrated into high priority I/O data in a scanned data transfer protocol using regular transmission fixed data blocks by allocating as little as a single word of the data block to the sequential transmission of this low priority data. Low priority data is buffered on both sides of this transmission to allow it to be transmitted over the course of many data block. As a result, the regular and predictable transfer of input and output data is not upset while allowing arbitrarily large low priority data to be sent at a relatively low data rate.

13 Claims, 3 Drawing Sheets

PROTOCOL FOR EXTENDED DATA TRANSFER IN SCAN-BASED INDUSTRIAL CONTROLLER I/O SYSTEM

CROSS-REFERENCE TO RELATED APPLICATIONS

This application claims the benefit of provisional application No. 60/168,001 filed on Nov. 30, 1999.

STATEMENT REGARDING FEDERALLY SPONSORED RESEARCH OR DEVELOPMENT

BACKGROUND OF THE INVENTION

The present invention relates to industrial controllers for controlling industrial processes and manufacturing equipment and in particular to a communication protocol allowing a low priority, low data rate transmission to be superimposed on time critical transfer of input/output data.

Industrial controllers are special purpose computers used for controlling industrial processes and manufacturing equipment on a real-time basis. Under the direction of a stored program, the industrial controller examines a set of inputs reflecting the status of the controlled process and changes a set of outputs controlling the industrial process. The inputs and outputs may be binary, that is on or off, or analog, providing a value within a continuous range. Typically analog signals are converted to binary words for processing. Industrial controllers differ from conventional computers in that their hardware configurations vary significantly from application to application reflecting their wide range of uses. This variability is accommodated by constructing the industrial controller on a modular basis having removable input and output (I/O) modules that may accommodate different numbers of input and output points depending on the process being controlled. The need to connect the I/O modules to different pieces of machinery that may be spatially separated has led to the development of a remote I/O rack holding a number of I/O modules at a remote location to communicate with a central processor of the industrial control via an adapter module, which in turn is connected with a high speed network linked to the central processor. The adapter exchanges information between the network and the I/O modules.

Industrial controllers further differ from conventional computers in that they must process a large amount of input and output data on a predictable real-time basis. This requires not only that the response time of the industrial controller be extremely fast, but also that the processing delay between a changing input and the response of a reacting output be consistent so that the controller operates predictably over time.

To satisfy these requirements of speed and consistency, many industrial controllers use "scan" based architecture in which each input and output are sequentially read and written over repeated scans of regular duration. This scan protocol may also be used in the communication between an adapter module and the I/O modules of a remote I/O rack. The regular scanning places a predictable upper bound on the time between successive reading and writing of inputs and outputs and, by enforcing a particular order of those readings and writings, eliminates certain "race" conditions in which the execution of the control program changes fundamentally because of a different-ordered reading of two inputs that change at nearly the same time.

In order to ensure the regular period of the scanning, the transfer of data is arranged into block of fixed size. The data blocks are desirably limited in size to the amount of data needed for a typical I/O module, taking into account the necessary I/O data and possible control data related to I/O module initialization and configuration. Typically the control data will be required only sporadically, but they are repeatedly transmitted to maintain the data block at a consistent size. When the I/O module receives a data block, the output data is transferred to the I/O module outputs and the control data written to the necessary registers. The I/O module prepares a second data block providing input values and control data to be sent to the controller.

The requirement of a fixed size data block for predictability in the scanning process greatly simplifies the communication protocol which may be handled by specialized integrated circuits. Nevertheless, the fixed size data block is an obstacle to advances in I/O module functionality which may require larger amounts of control data.

One possible solution is to increase the size of the fixed data block. Increasing the data block size, however, can adversely affect the scanning speed and is an inefficient way to accommodate control data that are only occasionally transmitted. Further changing the size of the data block renders obsolete all previous I/O modules incorporating interface electronics tailored for the previous block size resulting in increased hardware expense to users and possibly the need to redesign existing control programs.

What is needed is a way to accommodate increased control data without adversely affecting the transmission of real-time I/O data or modifying the size of the current data block.

BRIEF SUMMARY OF THE INVENTION

The present invention provides a method of adding control data of arbitrary length to current transfers of I/O data current scanning systems using fixed data blocks without affecting the amount or speed of the I/O data transfer. It does so by using the portion of the data block currently reserved for control data to form a low data rate communication channel in which data may be communicated piecewise over the course of many data blocks. Data for the low data rate channel is prepared by buffering control data of arbitrary size and allocating sequential portions of it to each data block. The thus fragmented and transmitted data may be recollected at the receiver by a similar buffering process.

Specifically, the present invention provides an industrial control I/O system for use with I/O modules attachable to a backplane having connector slots receiving I/O modules and providing data conductors and slot address signals specific to a connector slot. The I/O modules transmit real-time electrical values to an industrial process as determined by an I/O data unit. An adapter connecting to the backplane and executes a stored program to receive an I/O data unit and a low priority data unit for transmission over the backplane to a given I/O module. The adapter forms a transmission data block of fixed length incorporating the entire I/O data unit and only a portion of the low priority data unit smaller than the I/O data unit. It sequentially enables the address lines to each connector slot at a predetermined scan rate and when the address line to a connector slot holding the given I/O module is enabled, it transmits the transmission data block to the given I/O module in the connector slot. These steps are repeated with new I/O data units and different portions of the low priority data unit until the complete low priority data unit has been incorporated into different data blocks transmitted to the given I/O module in the connector slot.

Thus, it is one object of the invention to allow low priority data of arbitrary size to be integrated into a fixed scan-based backplane without compromising the delivery of real-time I/O data.

The backplane conductors may provide for the serial or parallel transmission of a data word and the portion of a low priority data unit may be as little as one data word.

Thus it is another object of the invention to provide an low data rate communication channel having minimal impact of the transmission of I/O data so as to satisfy communication task in industrial processes that do not require high speed data transmission but that do need to be transmitted at some time or from time to time.

The adapter may further program to, when the address line to the connector slot holding the given I/O module is enabled, receive a data block of fixed length from the given I/O module including a reply I/O data unit and a portion of a reply low priority data unit smaller than the reply I/O data unit. The adapter may transmit the reply I/O data unit to a connected industrial controller and collect the portion of the reply low priority data unit in a buffer and repeat these steps of receiving additional data blocks until the entire low priority data unit is in the buffer upon which it may transmit the reply low priority data unit to the industrial controller.

Thus it is another object of the invention to provide for bi-directional communication of low priority data.

The adapter may be further programmed to receive identification information from the given I/O module indicating whether it can accept extended low priority data transmissions. Only when the I/O module can accept extended low priority data transmissions will the adapter send portions of the low priority data.

Thus it is another object of the invention to allow for the construction of an adapter in backplane unit that may accept either "legacy" I/O modules not having the capability of receiving extended low priority data transmissions together with I/O modules that can use this feature.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 1:
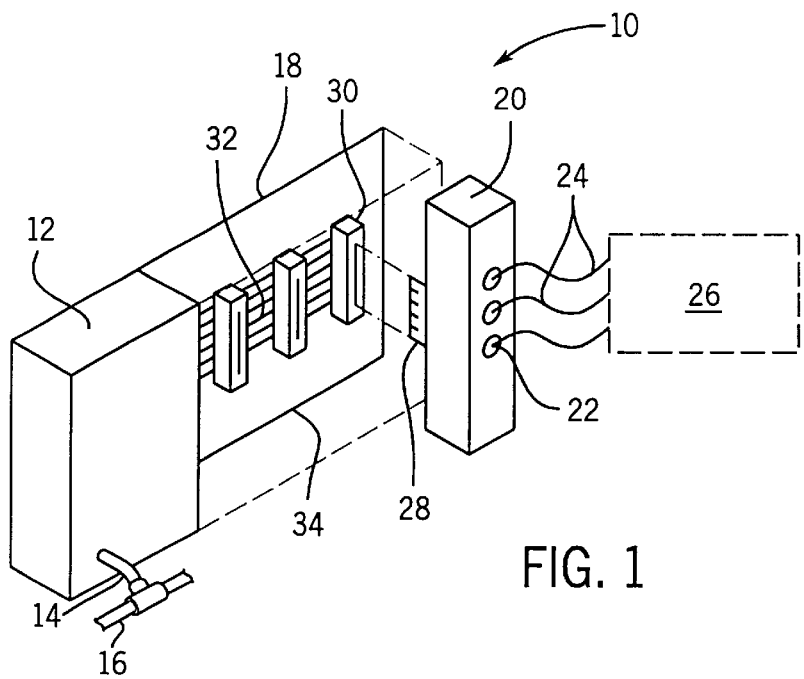
FIG. 1 is a simplified perspective view, in partial phantom, of an I/O system having an adapter communicating on a backplane to one or more detachable I/O modules which provide signals and receive signals with an industrial process.

Referring now to FIG. 1, an I/O system 10 for use with an industrial controller includes an adapter module 12 providing a connection 14 to a high-speed, serial network 16. The network 16 may be any one of a number of high-speed serial networks including ControlNet, EtherNet or the like. The adapter module 12 communicates over the network 16 with an industrial controller (not shown) to receive output data from the industrial controller or to provide input data to the industrial controller to be processed according to a control program.

The adapter module 12 communicates with a backplane 18 to connect it to one or more I/O modules 20. The I/O modules 20 connect via I/O lines 24 with a controlled process 26. As is understood in the art, the I/O modules 20 convert digital data received over the backplane 18 from the adapter module 12 into output signals (either digital or analog) in a form suitable for connection to the industrial process 26.

The I/O modules 20 may also receive digital or analog signals from the industrial process 26 and convert it to digital data suitable for transmission on the backplane 18 to the adapter module 12.

Modularity of the I/O system 10 is provided through a rear extending connector 28 on each I/O module 20 which may be mated with any one of a number of connectors 30 extending from the front surface of the backplane 18. The connectors 30 are each associated with "slots" providing mechanical features (not shown) for otherwise securing the I/O module 20.

In the shown parallel bus embodiment, connectors 30 receive parallel data bus conductors 32, over which data may be read and written, and slot address signals 34 which are enabled one at a time to indicate the slot and hence the I/O module 20 for which the data of data bus conductors 32 is intended or from which data is being solicited. The data bus conductors 32 also include control lines including a clock and read/write line indicating timing for a data transfer according to techniques well known in the art.

In an alternative serial bus embodiment, not shown, slot address signals are attached to the data blocks sent over a serial data bus connector or are implicit in the ordering or timing of the data blocks being sent. While the invention is applicable to both serial and parallel bus embodiments, only the former will be discussed in detail from which description the latter will be apparent to those of ordinary skill in the art.

Figure 2:
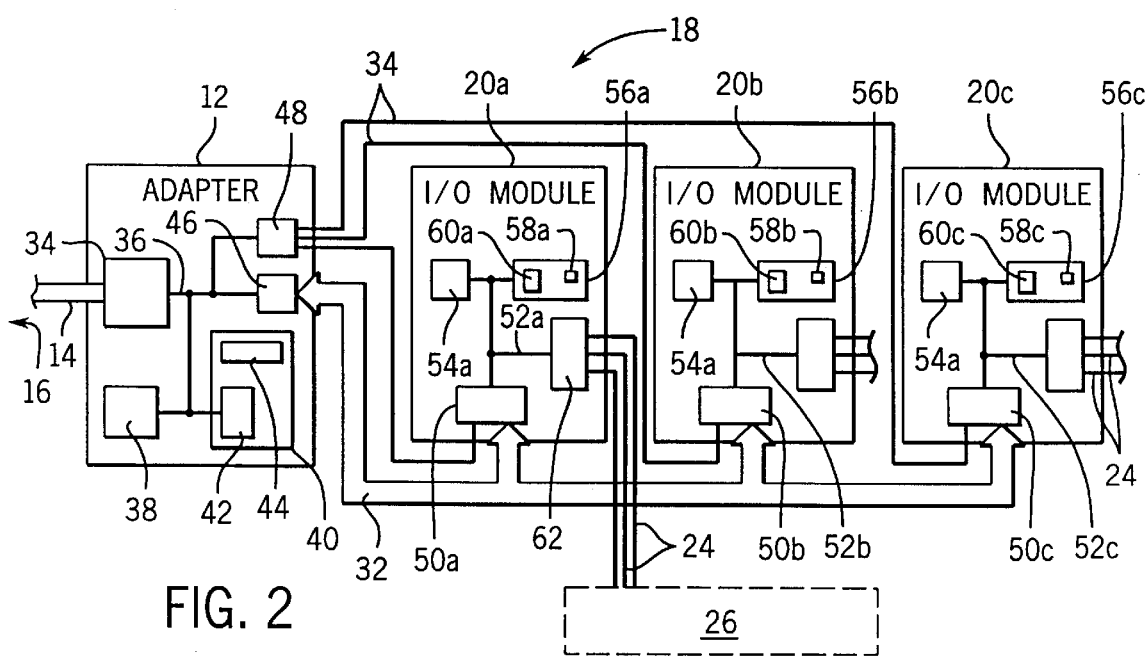
FIG. 2 is a block diagram of the I/O system of FIG. 1 showing the interconnection of the adapter to the I/O modules via backplane data conductors and slot address signals.

Referring now to FIG. 2, the adapter module 12 includes a network interface 35 communicating with the connector 14 to decode and encode data exchanged with the network 16. The network interface 35 in turn communicates with an internal bus 36 which connects the network interface 35 to a processor 38 and a memory 40. The memory 40 includes a buffer 42 (divided into input and output sections) and an operating program 44 allowing the processor 38 to operate on the data passing on the internal bus 36 according to the methods of the present invention as will be described.

The internal bus 36 also connects to backplane data interface 46 and backplane address decoder 48 I/O modules 20a–20c, when connected to the backplane 18, communicate with the data bus conductors 32 and slot address signals 34 via a backplane interface 50a–50c, respectively. In each I/O module 20a–20c, backplane interface 50 (each component denoted a–c to reflect the particular I/O module) in turn communicates with an internal bus 52, which communicates with an internal processor 54 and memory 56, the latter which includes a buffer portion 58 and an operating program 60 to allow the practice of the present invention. The internal bus 52 also communicates with I/O circuitry 62 providing level shifting, conversion and filtering necessary for the interface to the controlled process. The backplane interface 50 and address decoders 48 and 46 may be application-specific integrated circuits, which are not easily reprogrammable. A feature of the present invention is that it does not require a change in the basic backplane protocol established by these backplane circuits 50, 48 and 46 and that it allows overlaying of a new functionality on an existing system, this being one example, without significant change to the underlying architectural components.

Figure 3:
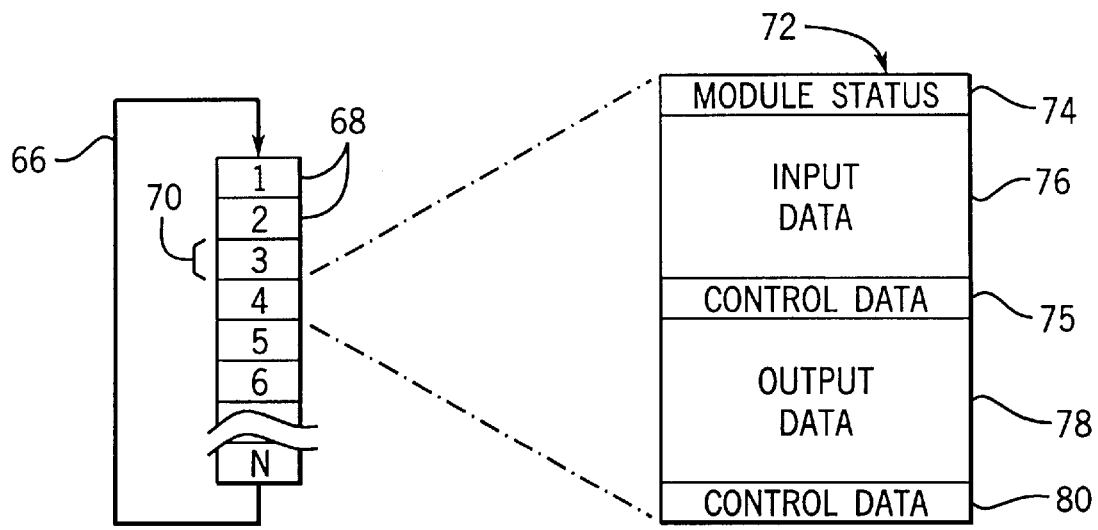
FIG. 3 is a schematic representation of the scanning process of the I/O system of FIGS. 1 and 2 showing the repeated sequential decoding of the address lines of different I/O modules and the fixed data blocks transferred between the adapter and the given I/O module of the decoded address per the prior art.

Referring now to FIGS. 2 and 3 in operation, the address decoder 48 sequentially decodes address lines 34 in a scan cycle 66 extending to N connector slots 30 (or N addresses 68) and then repeats the process looping through addresses 68 as indicated by the arrow. This scan cycle 66 provides a predictable order to the reading and writing of the I/O of the I/O system 10 and occurs at a regular speed so as to provide certainty in the frequency of reading each address 68 and in the time between reading of a given address 68 and a later address 68.

During an interval 70 in which each address 68 is decoded by the address decoder 48, a data block 72 is exchanged between a specific I/O module 20a through 20c and the adapter module 12. Part of that exchange is a reading operation where data is transferred from the I/O module 20a through 20c to the adapter module 12 from input data on I/O lines 24 and part of the exchange is a write operation in which data is transferred from the adapter module 12 to the I/O module 20 to become output data on I/O lines 24.

In the prior art, the data block 72 included first a module status word 74, miscellaneous read data 75 and input data 76 transferred during the reading operation. The module status word 74 provides indication of the operational conditions of the I/O module 20 and some additional data indicating the type of I/O module 20. During the write operation, the output data 78 and miscellaneous write data 80 may be transmitted from the adapter module 12 to the I/O module 20.

In order to preserve the predictability of the scan cycle 66, the sum of the input data 76 and output data 78 and miscellaneous data for a given address 68 is fixed. Further, the miscellaneous read data 75 and 80 is limited to a small portion of the input data 76 and output data 78 so as to provide maximum capacity for input and output data such as forms the core purpose of the I/O module 20. Although the miscellaneous read data 75 and 80 is normally only needed occasionally, e.g., at the beginning of the operation of the I/O system 10 to initialize and check certain status conditions of the I/O modules 20, because of the desire for regular and predictable data transmission times in the prior art miscellaneous read data 75 and 80 is retransmitted at every data block 72. This retransmission is necessary because data bandwidth must be reserved for miscellaneous read and write data 75 and 80 which has no other method to be sent or gathered from the module.

Figure 4:
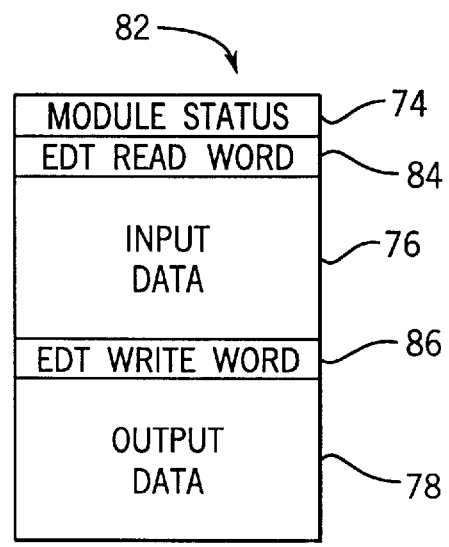
FIG. 4 is a view of the data block transmitted in the present invention showing the elimination of fixed control data in favor of extended data transmission fields.

Referring now to FIG. 4, the present invention preserves the scan cycle 66 and data block structure of the prior art but provides for a data block 82 having a format differing from format of data block 72. Specifically the data block 82 of the present invention eliminates the repeated miscellaneous read data 75 and write data 80 and replaces it with an extended data transfer (EDT) read word 84 and an extended data transfer (EDT) write word 86.

In a preferred embodiment, these EDT words 84 and 86 are each a single data word as defined by finest granularity of transmission of data on the bus whether serial or parallel. As such, the EDT read word 84 and the EDT write word 86 represent a convenient minimum possible displacement of input data 76 and output data 78 thus preserving a high bandwidth for this time critical input data 76 and output data 78. In fact in almost all cases this new structure increases the available space for 76 and 78 data, thus increasing the bandwidth for input 76 and output 78 data, in the original overall size data block 72.

For this reason, generally the EDT read word 84 and EDT write word 86 will be less than or equal to the size of the miscellaneous read data 75 and 80 they replace. The EDT read word 84 and EDT write word 86 provide greater data carrying capacity by means of a modification to the operating program 44 of the adapter module 12 and the I/O module 20 that allows data in the EDT read word 84 and EDT write word 86 to be parsed out word by word in transmission and accumulated as it is received and so that arbitrarily large amounts of data may be transmitted through the EDT read word 84 and EDT write word 86 over the course of many data blocks 82.

The effect of the EDT read word 84 and EDT write word 86, then, is to provide for an low data rate channel within the data block 82 suitable for use with low priority data where a delay may be accommodated, but having no upper bound in terms of how large an amount of unique data may be sent. In one example, the EDT read word 84 and EDT write word 86 may provide a 1,600 bit per second data channel in contrast to the data channel for the input data 76 and output data 78 which may be a hundred or more times this amount.

Figure 5:
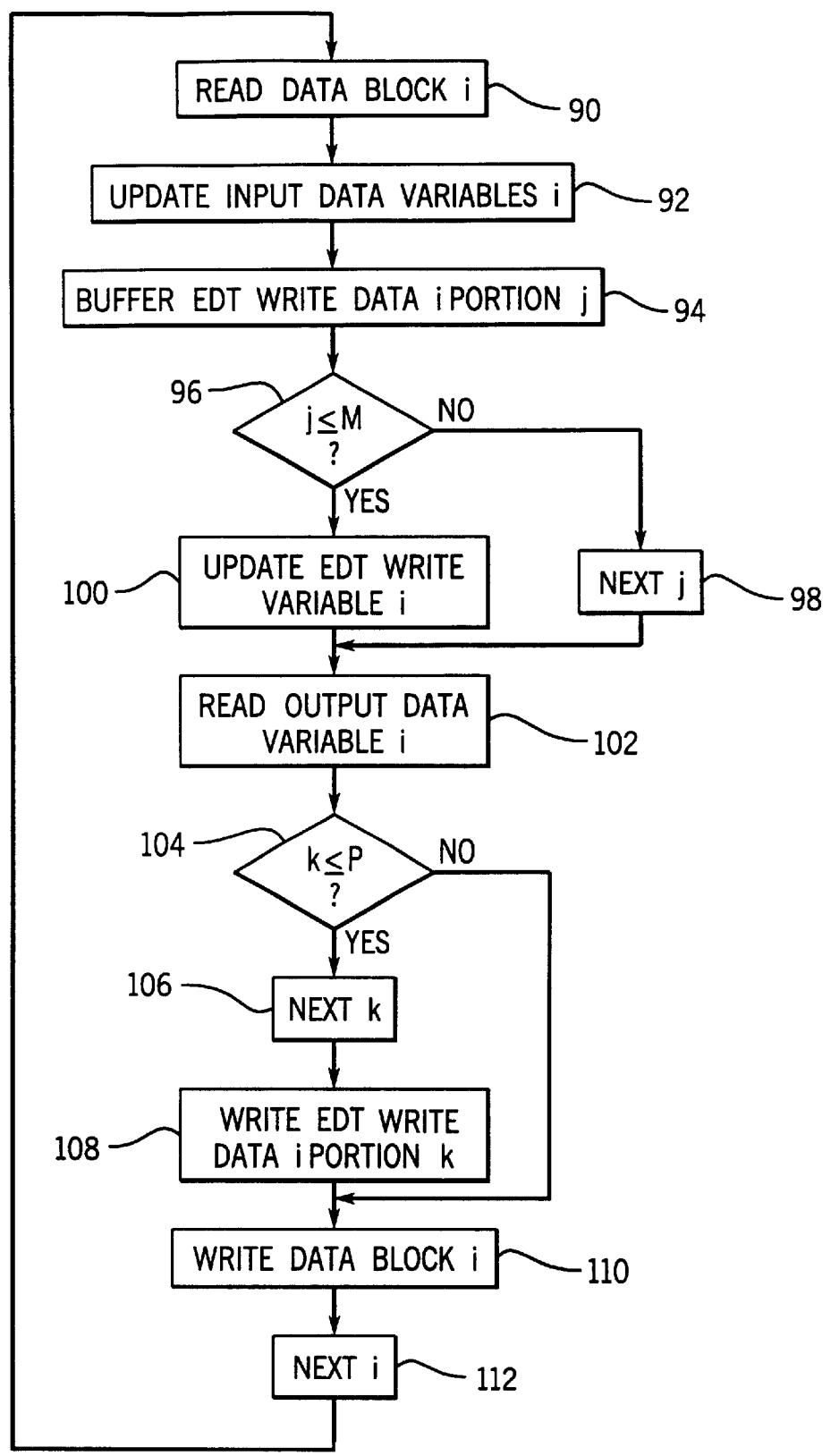
FIG. 5 is a flow chart showing the operation of both the adapter and the I/O module in exchanging data according to the protocol of the invention.

Referring now to FIG. 5, providing for the extended data transfer of EDT read word 84 and EDT write word 86 requires only modification of the higher level protocols of the adapter module 12 and I/O modules 20 which may be easily changed in firmware. Although these protocols affect the ultimate interpretation of the data block 82, the actual transmission of the data block 72 and its size and transmission rate is not affected, and the protocols that are handled by the circuits 50, 46 and 48.

The program required for the adapter module 12 and the I/O modules 20 to implement the present invention are mirror images of each other. In this regard, it will be understood that the program steps for reading by the adapter module 12 are preceded by program steps for writing by the I/O module 20 and program steps for writing by the adapter module 12 are followed by program steps for reading by the I/O module 20 where the reading and writing steps are essentially the same for each of the adapter module 12 and the I/O modules 20. For clarity, therefore, it will suffice to describe only a reading and writing as preformed by the adapter module 12 of the data block 82.

Referring now to FIG. 5, at the beginning of an exchange of data block 82 between the adapter module 12 and I/O module 20, as indicated by process block 90, a data block i is read by the adapter module 12 from the ith I/O module 20 (where i represents the address 68 that has been decoded as part of the address scan cycle 66 and may vary from 0 to I). The data block is read from the backplane 18 by the operation of the circuits 50, 46 and 48 and provided to the processor 38 over the internal bus 36. Processor 38 accepts this data block i and executing part of its operating program 44, at process block 92, updates the input variables associated with the input data 76 for that address i.

The adapter module 12 during its power-up routine read the module status word 74 which may indicate that the particular I/O module 20 is enabled for extended data transfer. If the I/O module 20 is not enabled for extended data transfer, the adapter module 12 adopts a prior art program for receiving data block 72 and blocks 94, 96, 98 and 100 described below are skipped.

Assuming that the data block 82 comes from an I/O module 20 enabled for extended data transfer as indicated by module status word 74, then at process block 94, the EDT read word 84 is placed within the input portion of buffer 42. Buffer 42 is partitioned for input into N partitions indexed by addresses n. Each partition n corresponds to one I/O module 20. The partitions n are further partitioned into M portions as indexed by sequence number m where m varies from 0 to M. M represents the size of the EDT data to be read divided by the size of the EDT read word 84. From the data block 82, the EDT read word 84 is placed in partition n equal to i and sequence number m.

The sequence number m is initially 0 and is incremented with the receipt of each EDT read word 84 to indicate the correct ordering of the EDT read words 84 in the buffer 42 to assemble them into a completed EDT read control variable. Completion of the EDT read control variable will be indicated when m equals M tested at decision block 96.

At decision block 96, so long as the latest EDT read word 84 has not completed the EDT read control variable, the program proceeds to process block 98 and the value of m is incremented so as to provide for proper buffer storage of the next EDT read word 84. If at decision block 96, however, the buffer 42 has been filled with the completed EDT read control variable, then the contents of the buffer 42 is stored in a variable reserved for that EDT read control variable. In the case of adapter module 12, the updating of the variable may be provided by the transmission of the completed variable to the industrial controller for execution of its program. The EDT read control variable may provide extended data indicating for example the serial number or other characteristics of the I/O module or may reflect data received by the I/O module 20 from other devices attached to the I/O module 20. The number and types of these EDT read variables is not limited.

At next data block 102, output data associated with address i is read from the industrial controller by the adapter module 12 from the network 16. A portion of the output data becomes the output data 78 of data block 82 and the output data is checked to see if it also includes a new EDT write control variable. An EDT write control variable may provide configuration information to an I/O module 20 or a data stream for communication by the I/O module 20 to other devices connected to the I/O module 20. If a new EDT write control variable is in the output data from the industrial controller, it is placed in the output data is buffered in memory 40 in the output part of buffer 42. The output portion of buffer 42 like the input portion is partitioned into K partitions indexed by addresses k each (where k corresponds to the address i of the I/O module 20 as above) partition further partitioned into P portions as indexed by sequence number p where p varies from 0 to P. P represents the size of the EDT data to be written divided by the size of the EDT write word 86.

At decision block 104, the sequence number p is checked to see if the transmission of the EDT write control variable has been completed as indicated by the condition of p being less than or equal to P. If that condition is not satisfied, indicating that there is additional EDT write control variable to be transferred, then the program proceeds to process block 106 and the value of p is incremented and at process block 108, portion p of the EDT read control variable for address i is read from the buffer 42 of memory 40 to prepare it for transmission.

At subsequent data block 110, the output data 78 for address i and the portion of the read EDT write control variable indicated by sequence number p is collected to form EDT write word 86 and provided to the circuits 46 and 48 for transmission completing the data exchange of data block 82.

If at decision block 104, p is greater than P indicating completion of the transfer of EDT write control variable, then process block 108 is skipped.

Finally at process block 112, the next address value is considered and the process loops back to process block 90 as part of the scan cycle 66.

In the case where the I/O module 20 is not enabled for extended data transfer, process blocks 104, 106, 108 are omitted.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An industrial control I/O system for use with I/O modules attachable to a backplane, the I/O modules transmitting real time electrical values to an industrial process via outputs of the I/O module determined by an I/O data unit, the I/O system comprising:

a backplane having connector slots receiving I/O modules and providing data conductors and slot address signals specific to a connector slot;

an adapter connected to the backplane and executing a stored program to:
  (a) receive an I/O data unit for transmission over the backplane to an I/O module;
  (b) receive a low priority data unit for transmission over the backplane to the I/O module;
  (c) form a transmission data block of predetermined length incorporating the entire I/O data unit and only a portion of the low priority data unit smaller than the I/O data unit;
  (d) sequentially enable the slot address signals to each connector slot at a predetermined scan rate; (e) when the slot address signal to a connector slot holding the I/O module is enabled, transmit the transmission data block to an I/O module in the connector slot; and
  (f) repeat step (a) and (c)–(e) where at step (a) a new I/O data unit is received and wherein at step (c) the transmission data block holds the new I/O data unit and a different portion of the low priority data unit, the repetition proceeding until the complete low priority data unit has been incorporated into different data block and transmitted to the I/O module in the connector slot;

whereby low priority data of arbitrary size can be integrated into a fixed scan based backplane without compromising the delivery of real-time I/O data.

2. The I/O system of claim 1 wherein the backplane conductors provide for the incremental transmission of a data word and wherein the portion of the low priority data unit is as little as one data word.

3. The I/O system of claim 2 wherein the data block is larger than the I/O data unit and smaller than the sum of the I/O data unit and the low priority data unit.

4. The I/O system of claim 1 wherein the adapter is connected to an industrial controller and further executes the stored program to:
(g) when the slot address signal for the connector slot holding the I/O module is enabled, receive a data block of fixed length from an I/O module in the connector slot holding a reply I/O data unit and a portion of a reply low priority data unit smaller that the reply I/O data unit;
(h) transmit the reply I/O data unit to the industrial controller;
(i) collect the portion of the reply low priority data unit in a buffer;
(j) repeat steps (g) through (i) to until the entire low priority data unit is in the buffer and then transmit the reply low priority data unit to the industrial controller.

5. The I/O system of claim 4 wherein the backplane conductors provide for the incremental transmission of a data word and wherein the portion of the reply low priority data unit is as little as one word.

6. The I/O system of claim 4 wherein the data block is larger than the reply I/O data unit and smaller than the sum of the reply I/O data unit and the reply low priority data unit.

7. An I/O system for use with I/O modules attachable to a backplane, the I/O modules communicating to an industrial process real time electrical values at outputs of the I/O module determined by an I/O data unit, the I/O system comprising:
a backplane having connector slots receiving I/O modules and providing data conductors and slot address signals specific to a connector slot;
an adapter connected to the backplane and executing a stored program to:
(a) receive an I/O data unit for transmission over the backplane to an I/O module;
(b) sequentially enable the address lines to each connector slot at a predetermined scan rate;
(c) when the address line to a connector slot holding a given I/O module is enabled, receive identification information from the given I/O module indicating whether it can accept extended low priority data transmissions;
(d) only when the given I/O module can accept extended low priority data transmissions:
(1) receive a low priority data unit for transmission over the backplane to the I/O module;
(2) form a transmission data block of fixed length holding the entire I/O data unit and only a portion of the low priority data unit smaller than the I/O data unit;
(e) only when the given I/O module cannot accept extended low priority data transmissions:
(1) form a transmission data block of fixed length holding the entire I/O data unit without a portion of a low priority data unit;
(f) transmit the transmission data block to an I/O module in the connector slot;
whereby I/O modules accepting the piecewise transmission of low priority data units may be intermixed on the backplane with I/O modules not accepting the piecewise transmission of low priority data units.

8. The I/O system of claim 7 wherein the backplane conductors provide for the incremental transmission of a data word and wherein the portion of the low priority data unit is as little as one word.

9. The I/O system of claim 7 wherein the data block is larger than the I/O data unit and smaller than the sum of the I/O data unit and the low priority data unit.

10. An I/O module receiving real time electrical values from an adapter over a backplane, the electrical values providing outputs of the I/O module determined by an I/O data unit to an industrial process, the I/O module comprising:
a connector adapted to connect physically and electrically to a connector slot of the backplane to communicate with data conductors and slot address signals specific to a connector slot;
a backplane communication circuit executing a stored program to:
(a) receive a data block over the backplane upon enabling of a slot address signal associated with the connector slot to which the I/O module may be connected;
(b) extract an I/O data unit from the data block;
(c) update outputs of the I/O module according to the I/O data unit;
(d) extract a portion of a low priority data unit from the data block; and
(e) store the portion of the low priority data unit to other stored portions of the low priority data block until all portions of the low priority data block have been received.

11. The I/O module of claim 10 wherein the backplane conductors provide for the incremental transmission of a data word and wherein the portion of the low priority data unit is as little as one data word.

12. The I/O module of claim 10 wherein the data block is larger than the I/O data unit and smaller than the sum of the I/O data unit and the low priority data unit.

13. The I/O module of claim 10 wherein the backplane communication circuit further executes the stored program to:
(g) provide to the adapter an indication that the I/O module can receive portions of low priority data units for storage until completion of the transmission of the entire low priority data unit.

* * * * *